United States Patent Office 3,546,321
Patented Dec. 8, 1970

3,546,321
POLYETHER GRAFT COPOLYMERS
Harold Jabloner and Edwin J. Vandenberg, Wilmington, Del., assignors to Hercules Incorporated, Wilmington, Del., a corporation of Delaware
No Drawing. Filed Feb. 8, 1967, Ser. No. 614,546
Int. Cl. C08g 1/18, 23/20; C08f 35/06
U.S. Cl. 260—874
7 Claims

ABSTRACT OF THE DISCLOSURE

Graft copolymers of polyethers, such as poly(epoxide)s and poly(aldehyde)s, with monomers capable of free radical polymerization, such as vinylidene compounds, wherein the grafts are attached through an ether oxygen to carbon alpha to ether oxygen in the polymer backbone. These graft copolymers are prepared from polyether hydroperoxides.

This invention relates to graft copolymers of polyethers and to the process of preparing them from polyether hydroperoxides, and more particularly to graft copolymers of polyethers wherein the graft is on carbon alpha to ether oxygen of the polymer backbone.

It is well known that graft copolymers of various olefin polymers can be prepared by the hydroperoxidation of the olefin polymer and subsequent free radical polymerization of polymerizable monomers at the hydroperoxide site.

Now in accordance with this invention it has been discovered that hydroperoxides of polyepoxides, polyaldehydes and epoxide—aldehyde copolymers can be produced which can in turn be copolymerized with vinylidene monomers to produce graft copolymers of said polyepoxides, polyaldehydes and epoxide—aldehyde copolymers.

Any polyether polymer having hydrogen attached to a carbon alpha to the ether oxygen can be hydroperoxidized to prepare the polyether hydroperoxides of this invention. Such polyethers will then have monomer units, which can be alike or different, having the general formula:

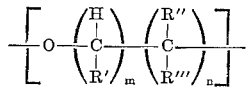

where $m$ is 1 to 4 and $n$ is 0 to 3 and the sum of $m+n$ is 1 to 4, and when the sum of $m+n$ is 1, R', R" and R'" are each H, alkyl, alkenyl, haloalkyl or alkoxyalkyl and when the sum of $m+n$ is 2 to 4, R" and R'" are each H, alkyl, alkenyl, haloalkyl, alkoxyalkyl, alkenyloxyalkyl, aryl, aryloxyalkyl, alkenylaryloxyalkyl, cycloalkyl, cycloalkenyl, cycloalkyloxyalkyl, alkenylcycloalkyl, or any two of R', R" and R'" can together form a cyclic structure.

Exemplary of such polyether polymers are homopolymers and copolymers of any two or more epoxides, such as the alkylene oxides containing 1–20 carbons, as for example, ethylene oxide, propylene oxide, butene-1 oxide, cis- and trans-butene-2 oxide, isobutylene oxide, dodecene-1 oxide, octadecene - 1 oxide, etc., cyclohexene oxide, 1-4-epoxycyclohexane, cyclooctene oxide, cyclododecene oxide, 1,2 - epoxycyclooctene - 5, cyclododecatriene monoxide, and styrene oxide; butadiene monoxide, vinylcyclohexene oxide, the substituted alkylene oxides wherein the substituents are halogen groups, haloalkyl groups, or alkoxy groups, for example, 1,1 - bis(chloromethyl) ethylene oxide, 1,1,1-trichloro-3,4-epoxybutane, 1,1,1-trifluoro-3,4-epoxybutane, 1,1,1 - tribromo-3,4-epoxybutane, etc., 1,4-dimethoxy-2,3 - epoxybutane, etc.; the epihalohydrins, such as epichlorohydrin, epifluorohydrin, epibromohydrin, etc.; alkyl glycidyl ethers such as methyl glycidyl ether, isopropyl glycidyl ether tert-butyl glycidyl ether, trifluoromethyl glycidyl ether, etc.; the aryl glycidyl ethers such as phenyl glycidyl ether, chlorophenyl glycidyl ether, o-allylphenyl glycidyl ether, naphthyl glycidyl ether, etc.; the alkenyl glycidyl ethers such as allyl glycidyl ether, crotyl glycidyl ether; oxetanes such as trimethylene oxide, 2- and 3-methyl, ethyl, propyl, isopropyl, butyl, etc., oxetanes, 2,3-dimethyl oxetane, 2,2-dimethyl oxetane, 2- and 3-phenyl oxetanes, 2- and 3-benzyl oxetanes,, 2- and 3-cyclohexyl oxetanes, 2- and 3-methoxy methyl oxetanes, etc.; tetrahydrofuranes such as tetrahydrofurane, 2-methyltetrahydrofurane, 2,3-dimethyltetrahydrofurane, 2,3,4-trimethyltetrahydrofurane, 2 - trifluoromethyltetrahydrofurane, 2,3,4 - tris(trifluoromethyl) - tetrahydrofurane, etc.; and the homopolymers and copolymers of any two or more aldehydes including alkanals such as formaldehyde, acetaldehyde, propionaldehyde, butyraldehyde, isobutyraldehyde, pivalaldehyde, hexanal, octanal, etc.; alkenals such as acrolein, methacrolein, crotonaldehyde, etc.; heterocyclic aldehydes such as furfural; and halo-, alkoxy-, etc.; substituted derivatives thereof such as chloral, trifluoroacetaldehyde, methoxyacetaldehyde, 3-ethoxypropionaldehyde, etc.; and the copolymers of any of these aldehydes and epoxides.

As already pointed out, any polyether having a hydrogen attached to a carbon atom alpha to an ether oxygen in the polymer backbone can be hydroperoxidized, the hydroperoxy groups being formed at such carbon atoms in the polymer backbone. The hydroperoxidation reaction is carried out by contacting the polyether polymer with oxygen in the presence of an initiating agent.

Any free radical generating agent can be used as an initiator for the oxidation. Exemplary of such initiators are azobis(isobutyronitrile), hydroperoxides, such as cumene hydroperoxide, p-menthane hydroperoxide, diisopropylbenzene monohydroperoxide, etc., peroxides, such as dicumene peroxide, benzoyl peroxide and diacetyl peroxide, persulfates, such as potassium and sodium persulfate, peroxycarbonates, such as diethyl peroxydicarbonate, diisopropyl peroxydicarbonate and the like. Optimum initiators are those which have rapid decomposition rates at low temperatures such as diisopropyl peroxydicarbonate and azobis(isobutyronitrile).

The oxygen-containing gas used in the preparation of the polyether hydroperoxides can be air, pure molecular oxygen, a mixture of molecular oxygen and one or more inert gases such as nitrogen, or any other convenient source. The hydroperoxidation can be carried out either in an aqueous suspension, solution, dispersion, or emulsion, or in a suspension, solution, etc. of the polyether polymer in any liquid organic diluent which is inert under the oxidation conditions. Suitable organic diluents include aromatic compounds such as toluene, benzene, mono-, di- and tri-chlorobenzene and xylene, and aliphatic saturated hydrocarbons having no tertiary hydrogen such as n-hexane, n-heptane, n-octane, etc.

If water is used as the reaction diluent, it may be desirable to add a surface-active agent, preferably a long chain quaternary ammonium salt, to the polyether and diluent. Suitable surfactants include the acetate of dehydroabietyl amine, hexadecyltrimethyl ammonium chloride, tetradecyl benzyl dimethyl ammonium chloride, etc.

The hydroperoxidation reaction is carried out at a temperature between about 0° C. and about 150° C., and preferably at a temperature between about 60° C. and about 100° C. The reaction can be operated either at atmospheric or superatmospheric pressures, and either as a batch or a continuous process.

Any desired amount of hydroperoxy oxygen, up to about 10% of theoretical, can be added to the polyether polymer. The hydroperoxidized polyethers will preferably contain from about 0.03% to about 4% by weight of the polymer of hydroperoxy groups. This is equivalent to about 0.1 to about 5 hydroperoxy groups per 100 monomer units.

The polyethers which are hydroperoxidized to produce the products of this invention can be of any desired molecular weight. Generally the polymers contain more than about 20 monomer units, and they can contain up to many thousands of monomer units. The hydroperoxidized polyethers of this invention are useful per se as free radical initiating catalysts, and as intermediates in the preparation of graft copolymers.

The preparation of graft copolymers from the hydroperoxides of this invention is effected by grafting polymerizable vinylidene monomers as side chains onto the polyether hydroperoxide main chain or backbone. The side chains are polymeric chains produced by polymerizing one or more of these vinylidene monomers, by a free radical mechanism, at free radical sites on the polyether backbone created by the decomposition of the hydroperoxy groups. Thus, one end of each side chain is chemically attached to the polyether backbone and the other end is free. Between these two terminal points can be any number of repeating monomer units, which units can be the same (as where only one vinylidene comonomer is used) or different (as where two or more vinylidene comonomers are used).

The grafting can be carried out directly in the suspension, solution, etc. of polyether hydroperoxide, prepared as described above, or the polyether hydroperoxide can be isolated prior to the initiation of grafting. It is preferable to remove the water or other diluent from the polymer suspension prior to the grafting step. This can be done by any suitable means such as evaporation, centrifuging, filtration, etc.

Graft copolymers are prepared from the polyether hydroperoxides of this invention by contacting the hydroperoxidized polyether and a polymerizable vinylidene monomer under such conditions that the hydroperoxide groups are decomposed to provide a free radical source for the initiation of graft polymerization of the monomer. Such conditions can be provided either by heating the mixture to a temperature sufficient to cause thermal decomposition of the hydroperoxy groups, i.e., about 50° C. to about 200° C., or by contacting the monomer and the polymer hydroperoxide in the presence of a reducing agent at a temperature between about −80° C. and about 200° C., preferably between about −20° C. and about 120° C. Preferably, the graft polymerization is carried out in a redox system, i.e., in the presence of a redox reducing agent. The graft polymerization can be carried out by bulk, solution, suspension, or emulsion polymerization techniques, and the particular reducing agent selected for decomposition of the hydroperoxide groups will depend upon the particular polymerization technique which is selected.

Redox reducing agents which can be used are salts or complexes of metals capable of existing in more than one valence state, and which are preferably in a reduced oxidation state. Particularly preferred redox reducing agents include vanadyl and ferrous sulfate, and vanadyl and ferrous acetylacetone. Other redox reducing agents which can be used are ferrous pyrophosphate, ferrous sulfide, the ferrous complex of ethylenedinitrilotetraacetic acid, ferrous o-phenanthroline, ferric acetylacetone, ferrocyanides, and the corresponding cobalt, nickel, copper, mercury, chromium, manganese, vanadyl, and the like compounds. Additional useful reducing agents include sodium formaldehyde sulfoxylate, formaldehyde and other aldehydes, polyamines such as diethylenetriamine, triethylenetretraamine, and tetraethylenepentamine, monoamines, sodium hyposulfite, mercaptans, hydrazine, phenyl hydrazine, and the like.

The graft polymerization of the vinylidene monomer and the hydroperoxidized polyether preferably is carried out in an inert atmosphere, such as under nitrogen. The reducing agent can be added to the polymer suspension prior to, simultaneously with, or subsequent to the addition of the monomer to the hydroperoxidized polymer. The monomer can be added in the form of a suspension, dispersion, etc., in water, an organic diluent, or a mixture thereof.

Any monomer containing ethylenic unsaturation which can be polymerized by a free radical mechanism can be grafted onto the hydroperoxidized polyether polymer chains to produce the graft copolymers of this invention. Exemplary of the monomers which can be so grafted, either alone or in admixture, are vinylidene and vinylene monomers, as for example, styrene and alkyl-substituted styrenes, such as α-methylstyrene, etc., olefins and diolefins such as ethylene, propylene, butene-1, butadiene, etc., esters of unsaturated acids such as methyl, ethyl, butyl, etc., esters of acrylic, methacrylic and α-chloroacrylic acids and the like, unsaturated acids such as acrylic or methacrylic acid, unsaturated nitriles such as acrylonitrile, methacrylonitrile, etc., unsaturated halides such as vinyl chloride, vinylidene chloride, etc., vinyl esters such as vinyl acetate, vinyl propionate, and the like, vinyl pyridine, allyl compounds such as allyl acetate, allyl alcohol, allyl chloride, methallyl acetate, allyl amine, etc., diethyl maleate, maleic anhydride, acrylamide, methacrylamide, diethylaminoacrylamide, diethylaminoethyl acrylate, and the like. Mixtures of two or more of these monomers can also be grafted onto the polyether backbone. Particularly preferred monomers are acrylic acid, methyl methacrylate, dimethylaminoethyl methacrylate, acrylonitrile, vinyl acetate, and acrylamide.

The amount of monomer which is grafted onto the polyether main chain through the free radical sites created by the decomposition of the hydroperoxide groups can be varied over a wide range, depending on the number of free radical sites available on the main chain and the length of the side chain. However, in general, amounts sufficient to produce a final graft copolymer containing about 2 to about 100,000 parts of monomer per 100 parts polyether in the main chain is generally used, with from about 5 to about 10,000 parts of monomer per 100 parts of polyether being preferred. Particularly useful graft copolymers contain from about 20 to about 500 parts of polymerized monomer per 100 parts of polyether.

The graft copolymers of this invention provide polyether polymers having modified and improved solid state properties (plasticization) and solubilities and solution properties, which render these modified polyethers useful as emulsifiers, films, and fibers. Further, the introduction of the functional groups supplied by the grafted monomers allows subsequent reaction of the graft copolymers, rendering them useful for preparing cross-linked compositions, etc.

The following examples will illustrate the preparation of the graft copolymers of polyethers in accordance with this invention. All parts and percentages are by weight unless otherwise indicated.

EXAMPLE 1

A reaction vessel was charged with 50 parts of a 1:1 mole ratio copolymer of ethylene oxide and epichlorohydrin, having a reduced specific viscosity (RSV) of 5.0 as measured on a 0.1% solution in α-chloronaphthalene containing 3% acetylacetone at 100° C., and 550 parts of chlorobenzene. The resulting solution was sparged with oxygen for one hour and heated to 100° C. A solution of 0.08 part of azobis(isobutyronitrile) in four parts by volume of chlorobenzene was then slowly added to the hot copolymer solution. The reaction mixture was then cooled and the polymer was precipitated by pouring the solution into a large volume of hexane in a blender, with vigorous agitation. The resulting product was a tacky, colorless, transparent gum, which, after drying, was found to contain 0.095 meq. (milliequivalents) of active oxygen per gram.

EXAMPLE 2

Ten parts of the hydroperoxidized polymer prepared in Example 1 was charged to a reaction vessel, together with 100 parts of water and 25 parts of acrylic acid. The resulting suspension was sparged with nitrogen for 30 minutes, and then heated to 90° C. and stirred vigorously. A solution of 0.1 part of vanadyl sulfate ($VOSO_4 \cdot 2H_2O$) in 10 parts of water was added to the suspension over a period of about ten minutes. After this addition was complete, the reaction mixture was cooled. It was a thick white paste. This paste was triturated in acetone and extracted with water. The water solution of the product was then precipitated into acetone. The product was a gummy solid product which was water soluble and contained 3.2% chlorine. By comparison, the starting polyether contained 12.3% chlorine and was not water soluble.

EXAMPLE 3

Seventy-five parts of a poly(ethylene oxide), having an RSV of 42.3 as measured on a 0.1% solution in chloroform at 25° C., was dissolved in 830 parts of chlorobenzene. The gel-like solution was stirred, sparged with oxygen and with the temperature adjusted to about 65° C., a solution of 0.78 part of diisopropyl peroxydicarbonate in 17.7 parts of chlorobenzene was added during a period of 28 minutes. The mixture was then diluted with 220 parts of chlorobenzene and again a solution of 0.78 part of diisopropyl peroxydicarbonate in 17.7 parts of chlorobenzene was added during 20 minutes. The hydroperoxidized poly(ethylene oxide) so obtained was isolated by pouring the chlorobenzene solution into an equal volume of petroleum ether. The white polymer so produced contained 0.045 meq. of active oxygen per gram.

EXAMPLE 4

A solution of 35 parts of the hydroperoxidized polyethylene oxide prepared in Example 3 and 100 parts of methyl methacrylate in 300 parts of benzene was sparged with nitrogen and heated to about 65° C. To the solution was then added 1.0 part of trimethylamine, 0.22 part of benzoin and 0.1 part of ferric stearate. The reaction mixture was heated for 1 hour at 65° C., after which the product was isolated by pouring the reaction mixture into petroleum ether. The graft copolymer of methyl methacrylate on polyethylene oxide so obtained was a white fibrous solid.

Film was prepared from this graft copolymer by pressing the polymer into sheets. The film so obtained was tough and was found to have a greatly reduced water sensitivity over that of the original polyethylene oxide. This new plastic is useful for applications where retarded water solubility is required as in caps for underwater explosives and as temporary protective coatings. It is also useful as an emulsifier.

EXAMPLE 5

To a solution of 25 parts of the same polyethylene oxide used in Example 3, in 550 parts of chlorobenzene at 100° C., was added, during 30 minutes, 0.5 part of azobis(isobutyronitrile). The hydroperoxidized polyethylene oxide so obtained was then isolated as described in Example 3. It contained 0.038 meq. of active oxygen per gram.

One part of this polyethylene oxide hydroperoxide, 70 parts of water and 10 parts of methyl methacrylate were charged to a nitrogen filled vessel and agitated for 16 hours at 65° C. The product so obtained was a stable latex of poly(ethylene oxide)—methyl methacrylate graft copolymer and poly(methyl methacrylate). This latex could be diluted with alcohol without coagulating and in this diluted form was stable at temperatures as low as −80° C.

It is useful as a removable protective coating or fiber finish which can be applied from low viscosity medium and which can be removed by washing.

EXAMPLE 6

Fifty parts of a commercial polyformaldehyde (Celcon M-90 sold by Celanese Polymer Company), from which the stabilizers had been extracted with methylene chloride, was suspended in 275 parts of chlorobenzene and the suspension was heated to 100° C. under oxygen. One part of azobisisobutyronitrile was then added during a period of 30 minutes. The reaction mixture was cooled, and the product was separated by filtration and washed with benzene and with petroleum ether. The hydroperoxidized polyformaldehyde, after drying was a white solid and contained 0.045 meq. active oxygen per gram.

A nitrogen filled vessel was charged with 35 parts of the hydroperoxidized polyformaldehyde, 100 parts of freshly distilled dimethylaminoethyl methacrylate and 125 parts of n-heptane. The mixture was sparged with nitrogen and, after heating to 65° C., a solution of 0.14 part of benzoin in 12 parts of benzene was added, followed by 0.063 part of ferric stearate. The mixture was stirred for 1 hour at 65° C., cooled, filtered, and the filter cake was washed with heptane. The white granular solid contained 8% dimethylaminoethyl methacrylate. The graft copolymer was isolated by extracting the product with acetone to remove any homopolymer of dimethylaminoethyl methacrylate. The graft copolymer so separated contained 4.1% of dimethylaminoethyl methacrylate. Incorporation of the dimethylaminoethyl methacrylate in the polyformaldehyde greatly increased the dyeability of the polyformaldehyde.

What we claim and desire to protect by Letters Patent is:

1. A graft copolymer of a polyether polymer and at least one free radical polymerizable vinylidene monomer wherein the grafts of said graft copolymer are chemically attached through an ether oxygen to carbon alpha to ether oxygen of the polyether backbone, the monomer units of said polyether having the formula

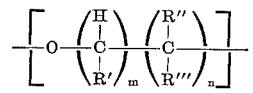

where $m$ is 1 to 4 and $n$ is 0 to 3 and the sum of $m+n$ is 1 to 4, and (A) when the sum of $m+n$ is 1, R′, R″ and R‴ are each H, alkyl, alkenyl, haloalkyl, or alkoxyalkyl, or (B) when the sum of $m+n$ is 2 to 4, R′, R″ and R‴ are each H, alkyl, alkenyl, haloalkyl, alkoxyalkyl, alkenyloxyalkyl, aryl, aryloxyalkyl, alkenylaryloxyalkyl, cycloalkyl, cycloalkenyl, cycloalkyloxyalkyl or alkenylcycloalkyl, or any two of R′, R″ and R‴ together form a cyclic structure.

2. The product of claim 1 wherein the polyether polymer is a poly(epoxide).

3. The product of claim 1 wherein the polyether polymer is a poly(aldehyde).

4. The product of claim 1 wherein said graft copolymer contains from about 2 to about 100,000 parts of said copolymerized vinylidene compound per 100 parts of said polyether.

5. The product of claim 4 wherein said polyether is a copolymer of ethylene oxide and epichlorohydrin and said vinylidene compound is acrylic acid.

6. The product of claim 4 wherein said polyether is poly(ethylene oxide) and said vinylidene compound is methyl methacrylate.

7. The product of claim 4 wherein said polyether is polyformaldehyde and said vinylidene compound is dimethlaminoethyl methacrylate.

References Cited

UNITED STATES PATENTS

| | | | |
|---|---|---|---|
| 2,911,398 | 11/1959 | Vandenberg | 260—874 |
| 3,033,841 | 5/1962 | Germain | 260—89.1 |
| 3,249,654 | 5/1966 | von Bonin et al. | 260—874 |
| 3,321,554 | 5/1967 | Zimmermann et al. | 260—874 |
| 3,384,682 | 5/1968 | Erchak et al. | 260—874 |
| 3,398,074 | 8/1968 | Eguchi et al. | 260—874 |
| 3,418,354 | 12/1968 | Wheeler | 260—874 |

FOREIGN PATENTS

| | | | |
|---|---|---|---|
| 1,077,430 | 9/1960 | Germany | 260—874 |
| 1,084,917 | 12/1960 | Germany | 260—874 |
| 978,752 | 12/1964 | Great Britain | 260—874 |

OTHER REFERENCES

German printed application 1,111,394, July 1961.

SAMUEL H. BLECH, Primary Examiner

U.S. Cl. X.R.

117—161; 149—3; 252—351, 356; 260—29.6, 33.4, 887, 895, 897, 898, 899, 901

PO-1050
(5/69)

UNITED STATES PATENT OFFICE
CERTIFICATE OF CORRECTION

Patent No. 3,546,321  Dated December 8, 1970

Inventor(s) Harold Jabloner and Edwin J. Vandenberg Case 1

It is certified that error appears in the above-identified patent and that said Letters Patent are hereby corrected as shown below:

Column 3, line 38 after " groups. " the following sentence should be inserted, -- As is well known in the art, the free radical site created on decomposition of a hydroperoxy group is an RO· free radical and the R in such a radical from the decomposition of a polyether hydroperoxide would be the polyether backbone. --.

Column 3, line 39, insert between " attached to ", -- through an ether oxygen --.

SIGNED AND
SEALED
MAR 9 1971

(SEAL)
Attest:

Edward M. Fletcher, Jr.
Attesting Officer

WILLIAM E. SCHUYLER,
Commissioner of Patent